US012063327B2

(12) United States Patent
Hayes et al.

(10) Patent No.: US 12,063,327 B2
(45) Date of Patent: *Aug. 13, 2024

(54) CONTEXT-AWARE AUDIO INTERFACING

(71) Applicant: LIVEPERSON, INC., New York, NY (US)

(72) Inventors: Marc Hayes, Atlanta, GA (US); Matt Fanning, Atlanta, GA (US)

(73) Assignee: LIVEPERSON, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,522

(22) Filed: May 12, 2023

(65) Prior Publication Data

US 2023/0412733 A1 Dec. 21, 2023

Related U.S. Application Data

(63) Continuation of application No. 17/869,853, filed on Jul. 21, 2022, now Pat. No. 11,689,661, which is a continuation of application No. 17/469,408, filed on Sep. 8, 2021, now Pat. No. 11,431,849, which is a continuation of application No. 17/076,085, filed on Oct. 21, 2020, now Pat. No. 11,146,683, which is a continuation of application No. 16/835,695, filed on Mar. 31, 2020, now Pat. No. 10,893,145, which is a continuation of application No. 16/715,955, filed on Dec. 16, 2019, now Pat. No. 10,686,938.

(60) Provisional application No. 62/766,601, filed on Dec. 18, 2018.

(51) Int. Cl.
*H04M 3/51* (2006.01)
*H04M 3/42* (2006.01)
*H04M 3/523* (2006.01)

(52) U.S. Cl.
CPC ..... *H04M 3/5183* (2013.01); *H04M 3/42034* (2013.01); *H04M 3/5166* (2013.01); *H04M 3/5233* (2013.01); *H04M 3/5238* (2013.01)

(58) Field of Classification Search
None
See application file for complete search history.

(56) References Cited

U.S. PATENT DOCUMENTS

| 5,327,486 A * | 7/1994 | Wolff | H04W 4/16 379/212.01 |
|---|---|---|---|
| 5,349,636 A * | 9/1994 | Irribarren | H04L 51/066 379/212.01 |
| 5,764,748 A * | 6/1998 | Rosenthal | H04M 3/428 379/215.01 |
| 7,555,521 B1 * | 6/2009 | McLaughlin | H04M 3/5183 704/271 |
| 9,420,103 B1 * | 8/2016 | Varman | H04M 3/5235 |

(Continued)

*Primary Examiner* — Harry S Hong
(74) *Attorney, Agent, or Firm* — POLSINELLI LLP

(57) ABSTRACT

A redirection and messaging system receives telephony information identifying a caller and call context from a telephony system. The system selects one of a plurality of messaging operators based on the call context, optionally sends an introductory message to the caller via a messaging service, and generates a message interface for the selected message operator. The message interface includes the caller and call context and any messages sent between the caller and the selected message operator, with an input interface allowing the selected message operator to input and send messages to the caller.

60 Claims, 7 Drawing Sheets

(56) References Cited

U.S. PATENT DOCUMENTS

| | | | |
|---|---|---|---|
| 10,389,881 B1* | 8/2019 | Bird .................... | H04M 7/0048 |
| 10,574,814 B2* | 2/2020 | Okonkwo ........... | H04M 7/0042 |
| 10,686,938 B1* | 6/2020 | Hayes ................. | H04M 7/0042 |
| 10,893,145 B2* | 1/2021 | Hayes ................. | H04M 3/5238 |
| 11,146,683 B2* | 10/2021 | Hayes .................... | H04M 3/54 |
| 11,431,849 B2* | 8/2022 | Hayes ................. | H04M 7/0042 |
| 11,689,661 B2* | 6/2023 | Hayes ................. | H04M 7/0042 |
| | | | 379/265.09 |
| 2009/0161855 A1* | 6/2009 | Emerson ............... | H04M 3/465 |
| | | | 379/212.01 |
| 2009/0268895 A1* | 10/2009 | Emerson ................ | H04M 3/54 |
| | | | 379/212.01 |
| 2011/0182283 A1* | 7/2011 | Van Buren .......... | H04M 7/0066 |
| | | | 704/270.1 |
| 2015/0181037 A1* | 6/2015 | Bailey .................... | G06Q 40/08 |
| | | | 379/88.01 |
| 2016/0370952 A1* | 12/2016 | Karnewar ............... | H04W 4/16 |
| 2020/0195780 A1* | 6/2020 | Hayes ................. | H04M 7/0042 |
| 2020/0296211 A1* | 9/2020 | Hayes ................. | H04M 3/5238 |
| 2021/0044700 A1* | 2/2021 | Hayes ................. | H04M 3/5166 |
| 2023/0070860 A1* | 3/2023 | Hayes ................... | H04M 3/541 |

* cited by examiner

CONTEXT-AWARE AUDIO INTERFACING

CROSS-REFERENCES TO RELATED APPLICATIONS

This application is a continuation of U.S. patent application Ser. No. 17/869,853 filed Jul. 21, 2022, which is a continuation of U.S. patent application Ser. No. 17/469,408 filed Sep. 8, 2021, which is a continuation of U.S. patent application Ser. No. 17/076,085 filed Oct. 21, 2020, which is a continuation of U.S. patent application Ser. No. 16/835,695 filed Mar. 31, 2020, which is a continuation of U.S. patent application Ser. No. 16/715,955 filed on Dec. 16, 2019, which claims the benefit of U.S. Provisional Application No. 62/766,601 filed Dec. 18, 2018, each of these applications is hereby incorporated by reference in its entirety for all purposes.

BACKGROUND OF THE INVENTION

Field of the Invention

The present invention generally pertains to interactive telephony environments and interactive messaging environments. More specifically, the present invention pertains to redirection of a caller in a telephony environment from the telephony environment to a messaging environment utilizing context from at least one of the telephony environment, the caller's history, and the caller's device.

Description of the Related Art

Interactive voice response (IVR) is a technology that allows a human caller to call and communicate with a computer in a telephony environment. In an IVR telephony environment, the computer typically outputs prerecorded voice audio prompts that the human caller typically answers using dual-tone multi-frequency signaling (DTMF) tones input via a keypad of the human caller's telephone. Some IVR telephony environments allow human callers to answer the computer's prerecorded voice audio prompts with regular speech, which the computer then attempts to interpret via voice recognition.

IVR telephony systems are used by companies to service higher call volumes at lower cost. IVR telephony systems are often used by companies to answer common questions, such as business hours, without such calls needing to go through to a human operator. IVR telephony systems are also often used to determine why a human caller is calling so that the human caller can be directed to a human operator that might be able to assist the human caller. However, callers often complain that traditional IVR systems can often waste time by forcing the caller to listen to a lengthy recording reading every option of an extensive menu before the caller can make a selection. Callers can also often be placed on hold for long periods of time waiting to speak to a human operator after already having spent a long period of time navigating the IVR system, increasing their frustration.

SMS (short message service) is a text messaging service enabling text-based communication between two mobile phone devices using standardized communication protocols. MMS (multimedia message service) is a messaging service enabling communication between two mobile phone devices that sends images as well as text using standardized communication protocols. Rich text messaging services, such as Apple® Business Chat®, Facebook® Messenger®, or WhatsApp®, similarly enable image and text communication between devices, though some of these messaging services also enable group messaging between more than two devices and transfer of videos as well as images. These rich text messaging services, however, are not standardized across all devices, and typically require users to be subscribed to a corresponding messaging service. Messaging services, whether SMS or rich text messaging services, are convenient for users in that they enable asynchronous communication, alerting users when a message comes in without the users having to pay constant attention as they would during a traditional audio-based telephone phone call.

There is a need in the art for improved and intelligent integration between telephony environments and messaging environments.

SUMMARY

Techniques and technologies are described for context-aware caller redirection from a telephony environment to a messaging environment.

In one example, a method for context-aware caller redirection from a telephony environment to a messaging environment is provided. The method includes receiving telephony information from a telephony system. The telephony information includes a caller identifier corresponding to a caller device and call context provided by the caller device during a telephone call between the caller device and the telephony system. The method also includes selecting a selected messaging operator of a plurality of messaging operators based on the call context. The method also includes generating a messaging interface for the selected messaging operator. The messaging interface includes the caller identifier, the call context, and an input interface. The method also includes receiving a caller message from the caller via a messaging service. The method also includes updating the messaging interface to include the caller message in response to receipt of the caller message. The method also includes triggering transmission of an operator message to the caller device via the messaging service, the operator message input by the selected messaging operator via the input interface of the messaging interface. The method also includes updating the messaging interface to include the operator message in response to triggering transmission of the operator message.

In another example, a system for context-aware caller redirection is provided. The system includes one or more communication receivers, one or more memory units storing instructions, and one or more processors. Execution of the instructions by the one or more processors causes the one or more processors to perform system operations. The system operations include receiving, using the one or more communication receivers, telephony information from a telephony system. The telephony information includes a caller identifier corresponding to a caller device and call context provided by the caller device during a telephone call between the caller device and the telephony system. The system operations also include selecting a selected messaging operator of a plurality of messaging operators based on the call context. The system operations also include generating a messaging interface for the selected messaging operator. The messaging interface includes the caller identifier, the call context, and an input interface. The system operations also include receiving, using the one or more communication receivers, a caller message from the caller via a messaging service. The system operations also include updating the messaging interface to include the caller message in response to receipt of the caller message. The system operations also include triggering transmission of an operator message to the caller device via the messaging service, the operator message input by the selected messaging operator via the input interface of the messaging interface. The system operations also include updating the messaging interface to include the operator message in response to triggering transmission of the operator message.

In another example, a non-transitory computer-readable medium is provided having stored thereon instructions that, when executed by one or more processors, cause the one or more processors to perform a method context-aware caller redirection from a telephony environment to a messaging environment. The method includes receiving telephony information from a telephony system. The telephony information includes a caller identifier corresponding to a caller device and call context provided by the caller device during a telephone call between the caller device and the telephony system. The method also includes selecting a selected messaging operator of a plurality of messaging operators based on the call context. The method also includes generating a messaging interface for the selected messaging operator. The messaging interface includes the caller identifier, the call context, and an input interface. The method also includes receiving a caller message from the caller via a messaging service. The method also includes updating the messaging interface to include the caller message in response to receipt of the caller message. The method also includes triggering transmission of an operator message to the caller device via the messaging service, the operator message input by the selected messaging operator via the input interface of the messaging interface. The method also includes updating the messaging interface to include the operator message in response to triggering transmission of the operator message.

DETAILED DESCRIPTION

A redirection and messaging system receives telephony information identifying a caller and call context from a telephony system. The system selects one of a plurality of messaging operators based on the call context, optionally sends an introductory message to the caller via a messaging service, and generates a message interface for the selected message operator. The message interface includes the caller and call context and any messages sent between the caller and the selected message operator, with an input interface allowing the selected message operator to input and send messages to the caller.

Figure 1:
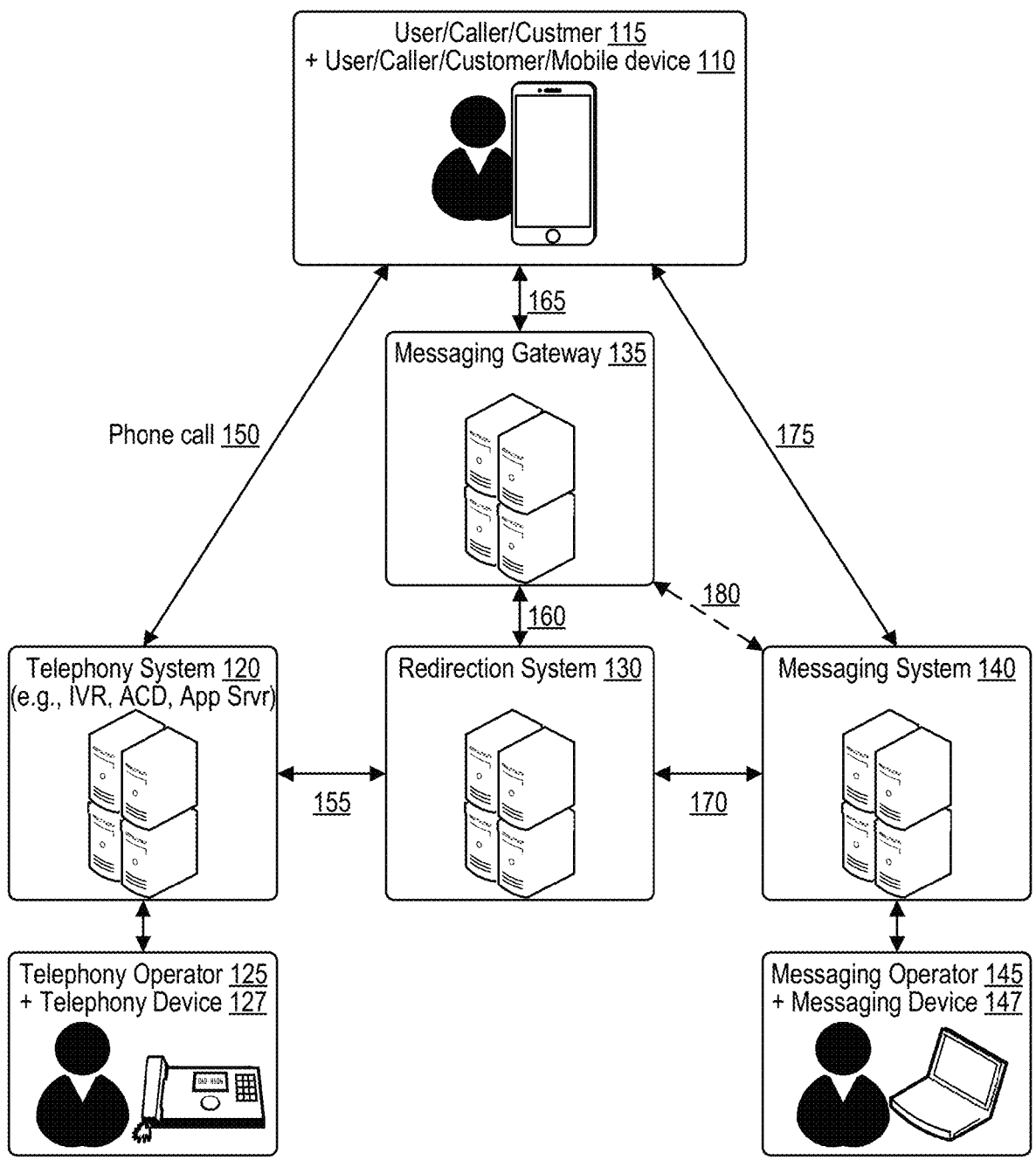
FIG. 1 illustrates a system architecture for intelligent redirection of callers from a telephony environment to a messaging environment.

FIG. 1 illustrates a system architecture for intelligent redirection of callers from a telephony environment to a messaging environment.

The system architecture of FIG. 1 includes a user 115, also referred to as caller 115, and an associated mobile device 110, such as a smartphone. The user 115 uses the mobile device 110 to initiate a phone call 150 to a telephony system 120. Alternately, the telephony system 120 may initiate the phone call 150 to the mobile device 110. The telephony system 120 may be an interactive voice response (IVR) telephony system 120.

During the phone call 150, the telephony system 120 may convey audio to the mobile device 110. This audio may include pre-recorded audio messages, such as menu options. This audio may include audio messages that the telephony system 120 at least partially generates using a text-to-speech algorithm, for example one in which the telephony system 120 generates audio that includes the user's name or other information identifying the user 115, or one in which the telephony system 120 generates audio that includes an account balance or other information associated with an object or service owned by the user 115 or otherwise associated with the user 115.

The user 115 may respond to the audio from the telephony system 120 by providing one or more inputs at the mobile device 110 (e.g., by pressing any combination of any of the numbers zero through nine and/or the point or star/asterix symbols) and thereby sending dual-tone multi-frequency signaling (DTMF) tones to the telephony system 120. These inputs/tones may correspond to menu options, such as true-false style responses or multiple-choice-style responses, for example. These inputs/tones may correspond to numeric entries, such as identification numbers or card numbers or account numbers, for example. The user 115 may alternately or additionally respond to the audio from the telephony system 120 by speaking a word or phrase, which the telephony system 120 may interpret via a speech-to-text algorithm. The telephony system 120 and user 115/mobile device 110 may thus have a back-and-forth conversation including one or more audio messages sent from the telephony system 120 to the mobile device 110 and one or more DTMF messages or voice messages (e.g., the voice of the user 115) sent from the mobile device 110 to the telephony system 120. At least a subset of these messages may alternate so as to form a back-and-forth conversation between the telephony system 120 and the mobile device 110. In this way, the telephony system 120 may gather information from the user 115 in an automated manner, such as by having the user 115 select options from one or more menus.

These menus may, for example, allow the user 115 to indicate to the telephony system 120 which of a number of languages are preferred, which of a number of reasons correspond to a reason why the user 115 called the telephony system 120, which of a number of skills or areas of expertise would be helpful for a human operator to have in order to properly help the user 115, information identifying the user, information identifying an object or service owned by or otherwise associated with the user, or combinations thereof. Information identifying the user may include, for example, the user's first name, middle name, last name, mailing address, residence address, email address, username, password, reference number/code, social security number, driver's license number/code, government issued identification number/code, or combinations thereof. Information identifying an object or service owned by or otherwise associated with the user may include, for example, an account number, a product or service serial number, a credit card number, a debit card number, an ATM card number, an insurance account/policy/group number, a bank account number, a bank routing number, or combinations thereof.

During the phone call 150, the telephony system 120 may connect the user 115 to one or more human or virtual telephony operators 125 by connecting the mobile device 110 to one or more telephony devices 127 (e.g., telephones with optional associated computer systems) associated with the one or more human or virtual telephony operators 125.

Any information received by the telephony system 120 from the mobile device 110 during interactions between the telephony system 120 and the mobile device 110/user 115 may be stored by the telephony system 120 as call context information. Likewise, information conveyed by the telephony system 120 to the mobile device 110 may also be stored by the telephony system 120 as call context information. This includes any interactions between the user 115/mobile device 110 and the one or more telephony operators 125/telephony devices 127.

In some cases, one or more recordings of the phone call 150 and/or transcripts of recordings of the phone call 150 (e.g., generated using speech-to-text and/or previously known transcriptions of pre-recorded audio from the telephony system 120) may be stored as call context information. This includes any interactions between the user 115/mobile device 110 and the one or more telephony operators 125/telephony devices 127. The call context information can be included in a set of telephony data that the telephony system 120 sends to a redirection system 130 via one or more data transmissions 155.

The telephony system 120 may receive a user/caller/device identifier associated with the user 115 and/or with the mobile device 110. For example, the telephony service 120 may use caller identification to identify a phone number associated with the mobile device 110 and/or a subscriber identification module (SIM) card associated with the mobile device 110. Caller identification may be referred to as caller ID (CID), calling line identification (CLI or CLID), calling number delivery (CND), calling number identification (CNID), calling line identification presentation (CLIP), or call display. Caller identification may include identification and transmission of a name associated with the telephone number, a service referred to as calling name delivery (CNAM). Any of these may be included as part of the caller identifier.

In some cases, the telephony system 120 may identify a type of the mobile device 110, for example by identifying whether the mobile device 110 is in fact a mobile device such as a smartphone or, instead, a more traditional wired landline telephone, or cordless landline telephone. In countries with a "mobile range" of phone numbers, where numbers within this range are almost always mobile numbers, this is one way to check the device type. In countries without a "mobile range," a test SMS can be sent to the phone number to see whether a response is returned, or the telephony system 120 can look up the phone number in public or private databases of SMS-capable phone numbers. The telephony system 120 can check whether the phone number is valid, for example whether a numbering plan area code (NPA), central office exchange code (NXX), and/or line/subscriber number are valid alone and/or in combination.

The telephony system 120 can also inquire from third party/proprietary/specialized messaging services whether corresponding a messaging software application are present on the caller device corresponding to the phone number. For example, in some cases, the telephony system 120 can inquire from an Apple® server as to whether the phone number corresponds to a device that has a software application or other interface for Apple® iMessage® or Apple® Business Chat®. In some cases, the telephony system 120 can inquire from a Google® server as to whether the phone number corresponds to a device that has a software application or other interface for Google® Rich Communication Services (RCS) for Business Messaging®, Google® Jibe®, Google® Hangouts®, Google® Allo®, or Google® Duo®. In some cases, the telephony system 120 can inquire from a Facebook® server as to whether the phone number corresponds to a device that has a software application or other interface for Facebook® Messenger®, Instagram® Direct Messages®, or WhatsApp®. In some cases, the telephony system 120 can inquire from a Slack® server as to whether the phone number corresponds to a device that has Slack® Channels®. In some cases, the telephony system 120 can inquire from a Line® server as to whether the phone number corresponds to a device that has Line®. In some cases, the telephony system 120 can inquire from a Viber® server as to whether the phone number corresponds to a device that has Viber®. In some cases, the telephony system 120 can inquire from a telecommunications provider as to whether the phone number corresponds to a device that has a Rich Communication Services (RCS) system provided by that telecommunications provider.

These third party/proprietary/specialized messaging services may be generally referred to as messaging services other than SMS or MMS (or an open cross-platform version of RCS). These entities can check whether the mobile device 110 includes the corresponding software application by pinging the software application on the mobile device 110 and seeing whether a response is received to the ping. Lack of response within a predetermined time period may indicate that the software application is not stored on and/or not installed on the caller device, or is locked behind restrictions put in place on the caller device that prevent the software application from successfully responding to the ping (e.g., firewall restrictions preventing outbound data or operating system restrictions preventing certain types of processes). Receipt of a response within the predetermined time period may itself be an indicator that software application associated with the messaging service is installed on the mobile device 110, though the response may instead be a response sent by the mobile device 110 indicating that the software application associated with the messaging service is not installed on the mobile device.

The response may also identify one or more settings/configurations of the software application, permissions given to the software application, or restrictions put on the software application by a firewall or operating system of the caller device or by the software application itself. For example, the response may identify whether the software application associated with the messaging service has permissions within the mobile device 110 to present notifications to the user 115 through the mobile device 110, which may impact whether messaging should be used, as the user 115 might not see messages from the software application if the software application lacks notification permission. The third party/proprietary/specialized messaging service may then interpret the response to identify whether the caller device has stored and/or installed the software application corresponding to the messaging service, and any other information such as the settings/configurations, permissions, and/or restrictions. The telephony system 120 may alternately or additionally ping one or more of these messaging service software applications on the mobile device 110 itself, and receive and interpret the response itself to see whether the software application is installed on the mobile device 110 and whether it has notification permissions on the mobile device 110 (and/or any other information about settings/configurations, permissions, or restrictions), rather than having a third party perform the ping and receive/interpret the response.

Third party/proprietary/specialized messaging service entities often also possess the phone number corresponding to the mobile device 110 when the corresponding software application, which may for example be provided by the user to the entities for use with a 2-factor authentication system involving a SMS message, a MMS message, or a phone call. In such cases, identifying whether the mobile device 110 has stored/installed the application may simply entail checking to see if such entities possess the phone number corresponding to the mobile device 110, which may for example be stored in a database.

Any data discussed above with respect to caller identification, determining whether the caller device 110 is a smartphone or landline phone, determining whether a software application corresponding to a particular messaging service is stored and/or installed on the caller device 110, and/or determining settings/configurations, permissions, or restrictions of the software device on the caller device 110 may be included as user/caller/device identifier and/or in a set of telephony data that the telephony system 120 sends to the redirection system 130 via one or more data transmissions 155.

Any of this data discussed above with respect to caller identification, determining whether the caller device 110 is a smartphone or landline phone, determining whether a software application corresponding to a particular messaging service is stored and/or installed on the caller device 110, and/or determining settings/configurations, permissions, or restrictions of the software device on the caller device 110, may alternately be acquired by the redirection system 130 and/or messaging system 140 and/or messaging gateway 135 (or some combination thereof) instead of by the telephony system 120. In such cases, the redirection system 130 and/or messaging system 140 and/or messaging gateway 135 (or some combination thereof) may optionally communicate this data back to the telephony system 120 via one or more communications 155 (optionally also via intermediate communications 160 and/or 165 and/or 170 and/or 175 and/or 180).

Whenever there are multiple choices for possible messaging services to use, an optimal messaging service (and/or channel) may be selected by the redirection system 130. The selection may alternately or additionally be performed by the telephony system 120, one or more messaging gateway(s) 135, and/or messaging system 140. The optimal messaging service (and/or channel) may be the messaging service/channel that the user 115 is most likely to use, to see, to read, or some combination thereof. For example, when a particular caller device 110 has stored/installed thereon a software application associated with one messaging service, but lacks any software application associated with another messaging service, then the messaging service with the associated software application installed on the caller device 110 should be selected as the optimal messaging service and the messaging service without the associated software application installed on the caller device 110 should not be selected as the optimal messaging service. Settings, configurations, permissions, and restrictions may also play a role in selection of the optimal messaging service. For example, a messaging service whose associated software application on the caller device 110 has more permissions (such as notification permissions discussed above) and/or fewer restrictions (such as firewall restrictions discussed above) should be selected as the optimal messaging service while another messaging service whose associated software application on the caller device 110 has fewer permissions and/or more restrictions should not be selected as the optimal messaging service. A messaging service whose associated software application is configured with particular settings or configurations may also be favored for selection as the optimal messaging service—for example a messaging service for which the user/caller has completed a profile/account/login for the associated software application should be favored, and a messaging service whose associated software application is selected on the caller device as the default messaging application should be favored. If it can be determined how often a particular caller uses one messaging service versus another, the messaging service that the caller uses more often can also be used. An optimal messaging service may also be selected at least in part by the user, for example with the user making a selection after being provided a list by the telephony system 120 during the phone call 150 (or during a previous phone call or messaging session), where the list may have already been pre-narrowed based on any of the other considerations in the paragraph. An optimal messaging service may also be selected at least in part based on past/historical interactions with the caller 115 and/or the caller device 110—for example, the caller 115 previously called using the caller device 110 and previously chose a particular messaging service—or previously initiated a messaging chat session using a particular messaging service—that particular messaging service may be selected as the optimal messaging service. Selection of the optimal messaging service may be based on messaging service preferences associated with and/or stored at the telephony system 120, redirection system 130, messaging system 140, messaging gateway 135, or some combination thereof. These messaging service preferences may rank messaging services based on capabilities of these messaging services, preferences of a messaging operator 145, preferences of a telephony operator 125, and/or preferences of a client using the telephony system 120, redirection system 130, messaging system 140, messaging gateway 135, or some combination thereof. For example, if a company that owns and operates a particular messaging service is a client of the redirection system 130, it may store a preference indicating that the particular messaging service that the client owns and operates is to be selected as the optimal messaging service—always, or whenever possible, or just when all else is equal.

The redirection system 130 receives telephony information from the telephony system 120 via one or more communications 155. This telephony information may include user/caller/device identifier information as discussed above, and may include call context information as discussed above. Examples of the telephony information are also illustrated in and discussed with respect to the "Caller Context" window 315 of FIG. 3. In some cases, the redirection system 130 may gather some of the telephony information discussed above itself rather than receive it from the telephony system 120. For example, the redirection system 130 may itself determine whether the mobile device 110 is in fact a mobile device such as a smartphone or, instead, a more traditional wired landline telephone, or cordless landline telephone. The redirection system 130 may likewise detect whether the mobile device 110 has a software application associated with a particular messaging service installed, and whether the software application associated with the messaging service has notification permissions on the mobile device 110, as described above with respect to the telephony system 120.

In response to receiving the telephony information from the telephony system 120, the redirection system 130 and/or the messaging system 140 may send an introductory message to the mobile device 110, either directly (not shown in FIG. 1) or through a messaging gateway 135 as an intermediary device. The messaging gateway 135 assists in conveying the introductory message from the redirection system 130 (via communication channel 160) or from the messaging system 140 (via communication channel 180) to the mobile device 110 (via communication channel 165). In some cases, the messaging gateway 135 may be used to then convey messages from the mobile device 110 back to the redirection system 130 and/or to the messaging system 140 and/or to the messaging device 147. The messaging gateway 135 may convey further messages between the mobile device 110 and the redirection system 130 and/or the messaging system 140 and/or the messaging device 147. In some architectures, the messaging gateway 135 may be unnecessary and therefore may be omitted or combined with one of the redirection system 130, the messaging system 140, and/or the messaging device 147.

The messaging gateway 135 may be an SMS messaging gateway device, such as a GSM gateway appliance, a direct-to-short message service center (SMSC) gateway (Direct-to-SMSC), a Direct-to-SMS gateway, or a Spreadsheet-to-SMS gateway. The messaging gateway 135 may alternately or additionally include a MMS gateway and/or a rich communication services (RCS) gateway. Such a messaging gateway 135 may include one or more a separate hardware devices from the redirection system 140 and messaging system 140, may include software running on the redirection system 140 and/or messaging system 140, or some combination thereof. Thus, any tasks discussed herein as performed by the messaging gateway 135 may be understood to be alternately or additionally performed by the redirection system 130, the messaging system 140, and/or by the messaging device 147.

The messaging gateway 135 may alternately or additionally include one or more servers associated with a third party messaging service, such as Apple® iMessage®, Apple® Business Chat® (ABC), Google® Rich Communication Services (RCS) for Business Messaging® (GRBM), Google® Jibe®, Google® Hangouts®, Google® Allo®, Google® Duo®, Facebook® Messenger® (FBM), WhatsApp®, Slack® Channels®, Skype® Instant Messenger®, Blackberry® Messenger®, Line®, Viber®, Rich Communication Services (RCS) provided by telecommunications provider(s), or similar services.

The redirection system 130 is connected to, and communicates with, a messaging system 140 via one or more communications 170. Either the redirection system 130 or the messaging system 140 selects a particular message operator 145 of a number of possible message operators, for example from a database of possible message operators, optionally based on the call context. The redirection system 130 and/or messaging system 140 may select the selected message operator 145 based on a language, skill, or area of expertise that the selected message operator 145 has, or based on a geographic area that the selected message operator 145 is located in or otherwise associated with. For example, if the call context collected by the telephony system 120 indicates that the user 115 prefers Spanish rather than English, the redirection system 130 and/or messaging system 140 may select a message operator 145 who is identified as fluent in Spanish, for example in a database of selectable message operators. Similarly, if the call context indicates that the user 115 is calling for tech support for a particular product, the redirection system 130 and/or messaging system 140 may select a message operator 145 who is identified in the database of selectable message operators as having technical skills/expertise, and optionally as having technical skills/expertise relevant to that particular product. Sometimes, the redirection system 130 and/or messaging system 140 may select a message operator 145 at least in part simply based on availability, to ensure that no one message operator 145 has too much assigned, and to ensure that no caller is kept waiting too long. In some cases, the redirection system 130 and/or messaging system 140 may rank possible/available message operators 145 so that the message operator 145 with the most relevant expertise/skill, with the most availability, with the closest geographic area, with the most relevant language, or some combination thereof, may be selected.

Figure 3:
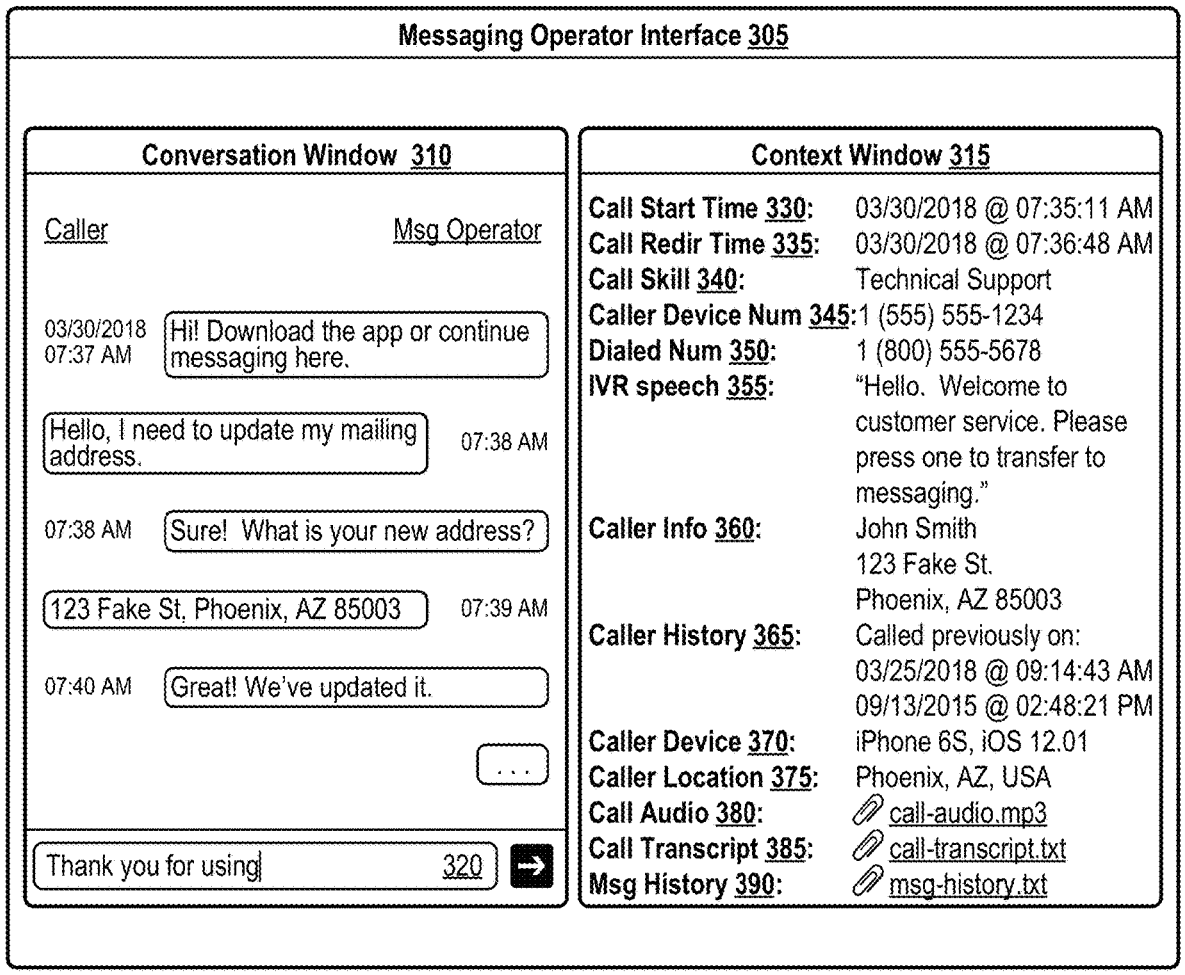
FIG. 3 illustrates a messaging operator user interface generated by the messaging system using context from the phone call.

The messaging system 140 receives at least a subset of the telephony information that the redirection system 130 received from the telephony system and generates a messaging operator interface 305 using this information, the messaging operator interface 305 for use by the messaging operator 145 using the messaging device 147. An exemplary messaging operator interface 305 is illustrated in FIG. 3. Using the messaging operator interface 305, the messaging operator 145 can see the telephony information, such as the call context information and the identifier of the user 115 and/or of the mobile device 110, and can read messages from the mobile device 110 and send messages to the mobile device 110, either directly (not shown in FIG. 1), through messaging system 140, through messaging gateway 135, or a combination thereof.

Figure 7:
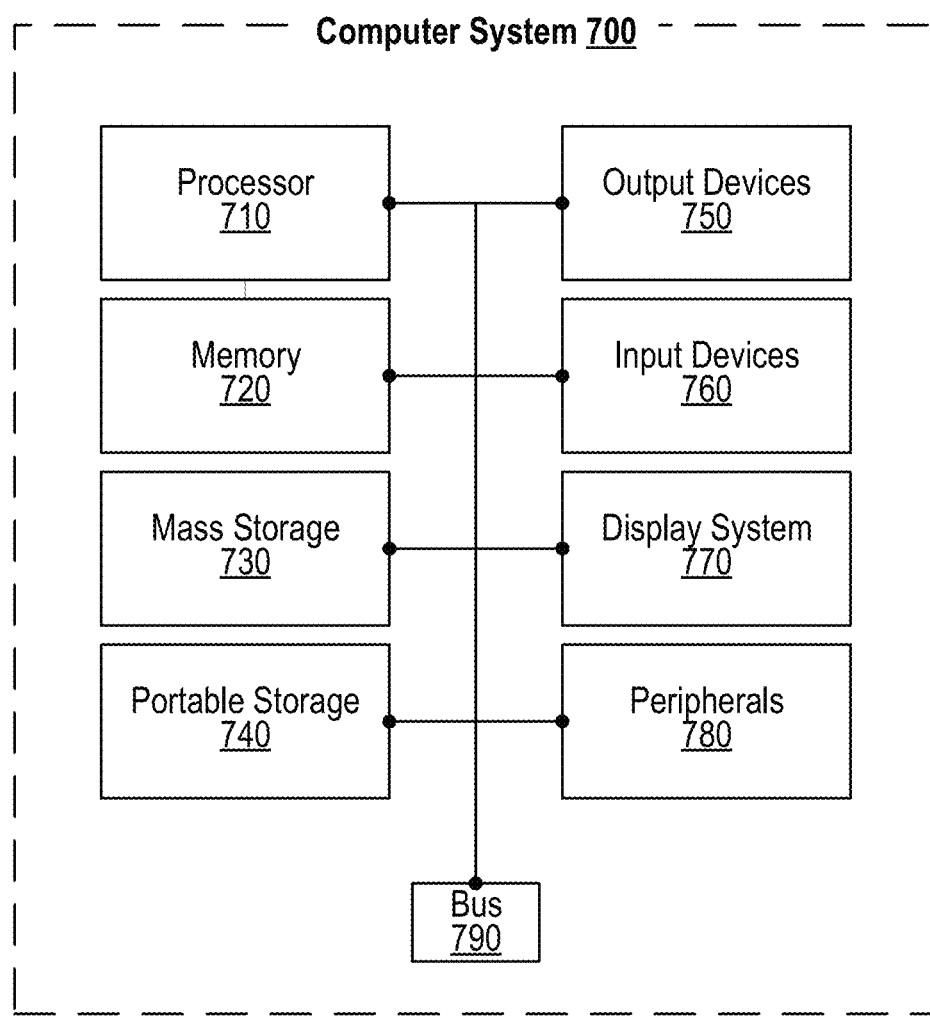
FIG. 7 is a block diagram of an exemplary computing device that may be used to implement some aspects of the subject technology.

The mobile device 110, telephony system 120, telephony device 127, redirection system 130, messaging gateway 135, messaging system 140, and messaging device 147 may each be computing devices 700 as illustrated in and discussed with respect to FIG. 7, or may include at least a subset of the components of such a computing device 700.

Figure 2:
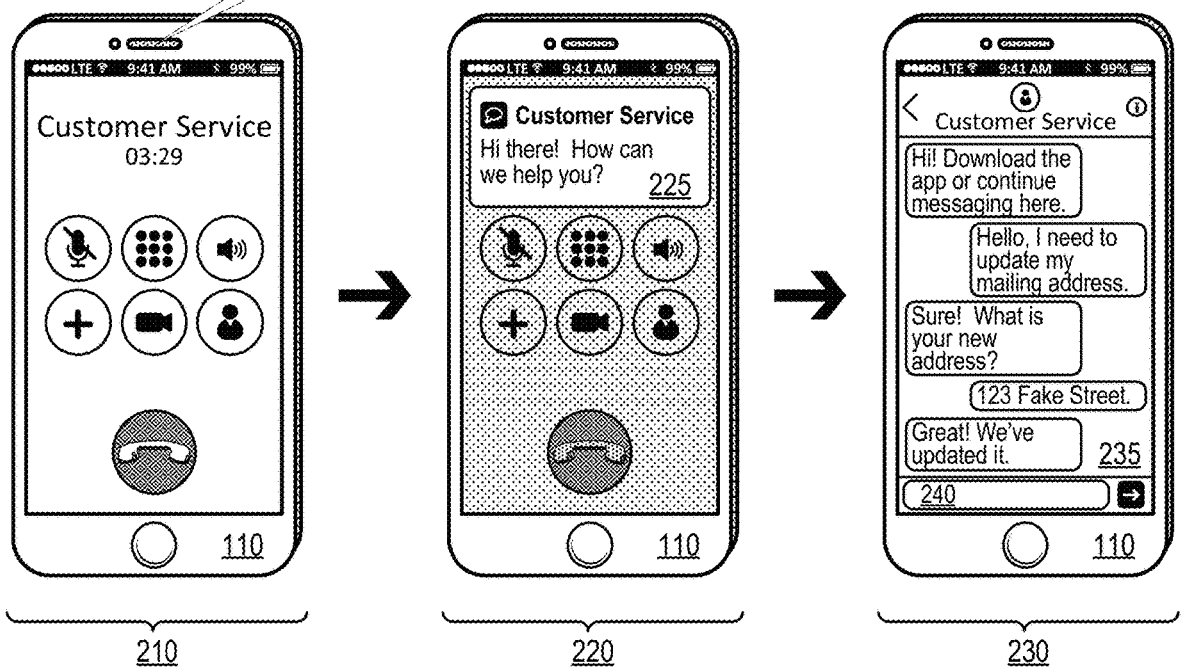
FIG. 2 is a flow diagram illustrating a mobile device user experience during redirection from a telephony environment to a messaging environment.

FIG. 2 is a flow diagram illustrating a mobile device user experience during redirection from a telephony environment to a messaging environment.

In user interface 210, the mobile device 110 displays a telephone call with a customer service telephony service 120. Prerecorded audio 215 is received by the mobile device 110 from the customer service telephony service 120 stating "Hello there! We've detected that you are using a smartphone with messaging capabilities! Press one to message with an expert from your phone. If you stay on the line, the wait time to reach an agent will be about 43 minutes. If you transfer to messaging, the wait time to reach an agent will be about 7 minutes."

In user interface 220, the mobile device 110 has presumably pressed "one," and the mobile device 110 displays a notification indicating that it has received an introductory message 225 from the customer service entity, the message 225 coming from the messaging gateway 135, the redirection system 130, the messaging system 140, the messaging device 147, or some combination thereof. Any path through these devices that the message 225 undertakes may be invisible to the mobile device 110. The introductory message 225 of FIG. 2 reads "Hi there! How can we help you?"

In user interface 230, the user 115 is having a messaging conversation 235 with the messaging operator 145 via multiple messages sent between the mobile device 110 and the messaging device 147, optionally through the messaging gateway 135 and/or the messaging system 140. The messaging conversation 235 reads as follows: "'Hi! Download the app or continue messaging here.'/'Hello, I need to update my mailing address.'/'Sure! What is your new address?'/'123 Fake Street.' 'Great! We've updated it.'" In the interface 230 of FIG. 2, the messages written by the user 115 and sent by the mobile device 110 are on the right-hand side of the conversation window 235, while the messages received by the mobile device 110 are on the left-hand side of the conversation window 235. Of the messages received by the mobile device 110, some can be written by the messaging operator 145 and sent from the messaging device 147, while others can be automatic messages sent by the redirection system 130 or messaging system 140. For example, the first message in conversation 235 ("Hi! Download the app or continue messaging here") could be an automatic introductory message sent from the redirection system 130 or messaging system 140 to the mobile device 110, optionally through the messaging gateway 135, while the remaining messages received by the mobile device 110 can be written by the messaging operator 145 and sent from the messaging device 147. In some cases, the messaging operator 145 may be a piece of software rather than a human being—in particular, the messaging operator 145 may be an artificially intelligent "chatbot" or virtual assistant capable of messaging with the user 115 at least about a few topics, such as topics relevant to customer service. For example, such a "chatbot" or virtual assistant may be capable of interpreting and understanding the user 115's request to change his or her mailing address, and may be capable of modifying a user account database corresponding to the user 115 to include the corrected mailing address provided by the user 115 during the conversation 235.

The user interface 230 also includes an input interface 240 through which the user 115 writes responses. The input interface 240 is illustrated as a text input field, but may also allow the user 115 to insert images, videos, audio, or other multimedia, and may allow the user 115 to add text formatting and change fonts, and mix text and multimedia into a rich media message.

FIG. 3 illustrates a messaging operator user interface generated by the messaging system using context from the phone call. The messaging operator user interface 305 of FIG. 3 includes a conversation window 310 and a context window 315.

The conversation window 310 includes conversation similar to the conversation 235 shown in user interface 230 of FIG. 2, but from the perspective of the messaging operator 145 rather than the user 115. The conversation in the conversation window 310 of FIG. 3 reads as follows: "'Hi! Download the app or continue messaging here.'/ 'Hello, I need to update my mailing address.'/'Sure! What is your new address?'/'123 Fake St., Phoenix, AZ 85003' 'Great! We've updated it.'" The conversation window 310 shows timestamps and optionally dates for each message. The messages on the right-hand side of the conversation window 310 are written by the message operator 145 and sent by the message device 147 (though they may also include some automated messages written and sent by the redirection system 130 and/or messaging system 140), while the messages on the left-hand side of the conversation window 310 are written by the user 115 and sent by the mobile device 110.

The conversation window 310 also includes an input interface 320 through which the message operator 145 writes responses. The input interface 320 is illustrated as a text input field, but may also allow the message operator 145 to insert images, videos, audio, or other multimedia, and may allow the message operator 145 to add text formatting and change fonts, and mix text and multimedia into a rich media message. The input interface 320 of FIG. 3 includes the unfinished message text "Thank you for using" written in, and the conversation window 310 includes a " . . . " ellipsis box indicating that the message operator 145 has written into the input interface 320 but has not yet sent.

The context window 315 optionally includes the telephony information received by the redirection system 130 from the telephony system 120, the telephony information including identifying information about the user 115 and/or the mobile device 110 as well as context information about the phone call 150.

The context window 315 of FIG. 3 includes a call start time 330 identifying when the call 150 began, the call start time 330 provided as Mar. 30, 2018 at 7:35:11 AM. The context window 315 includes a call redirection time 335 identifying when the user agreed to redirect the call to messaging and/or when the call was actually redirected to messaging, the call redirection time 335 provided as Mar. 30, 2018 at 7:36:48 AM.

The context window 315 of FIG. 3 includes a call skill 340 identifying a skill or expertise area that the user 115 wishes to discuss and/or that the messaging operator 145 was selected based on, the call skill 340 provided as "Technical Support." The context window 315 of FIG. 3 includes a caller device phone number 345 of the mobile device 110, provided as 1 (555) 555-1234. The context window 315 of FIG. 3 includes a dialed phone number 350 of the mobile device 110, provided as 1 (800) 555-5678. The context window 315 of FIG. 3 includes an IVR speech 355 identifying a transcript of prerecorded audio that was played by the telephony system 120 to the user 115 during the phone call 150, the IVR speech 355 provided as: "Hello. Welcome to customer service. Please press one to transfer to messaging."

The context window 315 of FIG. 3 includes caller information 360 identifying information about the user 115, provided as a name, "John Smith," and an address, "123 Fake St., Phoenix, AZ 951003." The context window 315 of FIG. 3 includes caller history 365 identifying that the user 115 has called the telephony service 120 before, once on Mar. 25, 2018 at 9:14:43 AM and once on Sep. 13, 2015 at 2:48:21 PM. The context window 315 of FIG. 3 includes caller device 370 identifying that the mobile device 110 is an iPhone 6S running operating system iOS version 12.01. The context window 315 of FIG. 3 includes caller location 375 provided as "Phoenix, AZ, USA."

The context window 315 of FIG. 3 includes call audio 380 with a hyperlink labeled "call-audio.mp3" directing to an attached MP 33 audio file of the recorded audio of the phone call 150. The context window 315 of FIG. 3 includes call transcript 385 with a hyperlink labeled "call-transcript.txt" directing to an attached text file of a transcript of the recorded audio of the phone call 150, the transcript transcribed via a speech-to-text algorithm run by the telephony service 120, by the redirection system 130, by the messaging system 140, or some combination thereof. The context window 315 of FIG. 3 includes message history 390 with a hyperlink labeled "msg-history.txt" directing to an attached text file of a transcript of the messages in the conversation window 310 and optionally the transcripts of one or more previous message conversations involving the user 115 and the telephony service 120, even if with a different operator 145. This way, the messaging operator 140 can review old messages and make sure not to lose important information discussed previously by or with the user. The call audio 380 and call transcripts 385 can also include the audio and transcripts, respectively, of one or more prior phone calls involving the telephony service, such as those listed in the caller history 365, so that the messaging operator 140 can review old messages and make sure not to lose important information discussed previously by or with the user.

Figure 4:
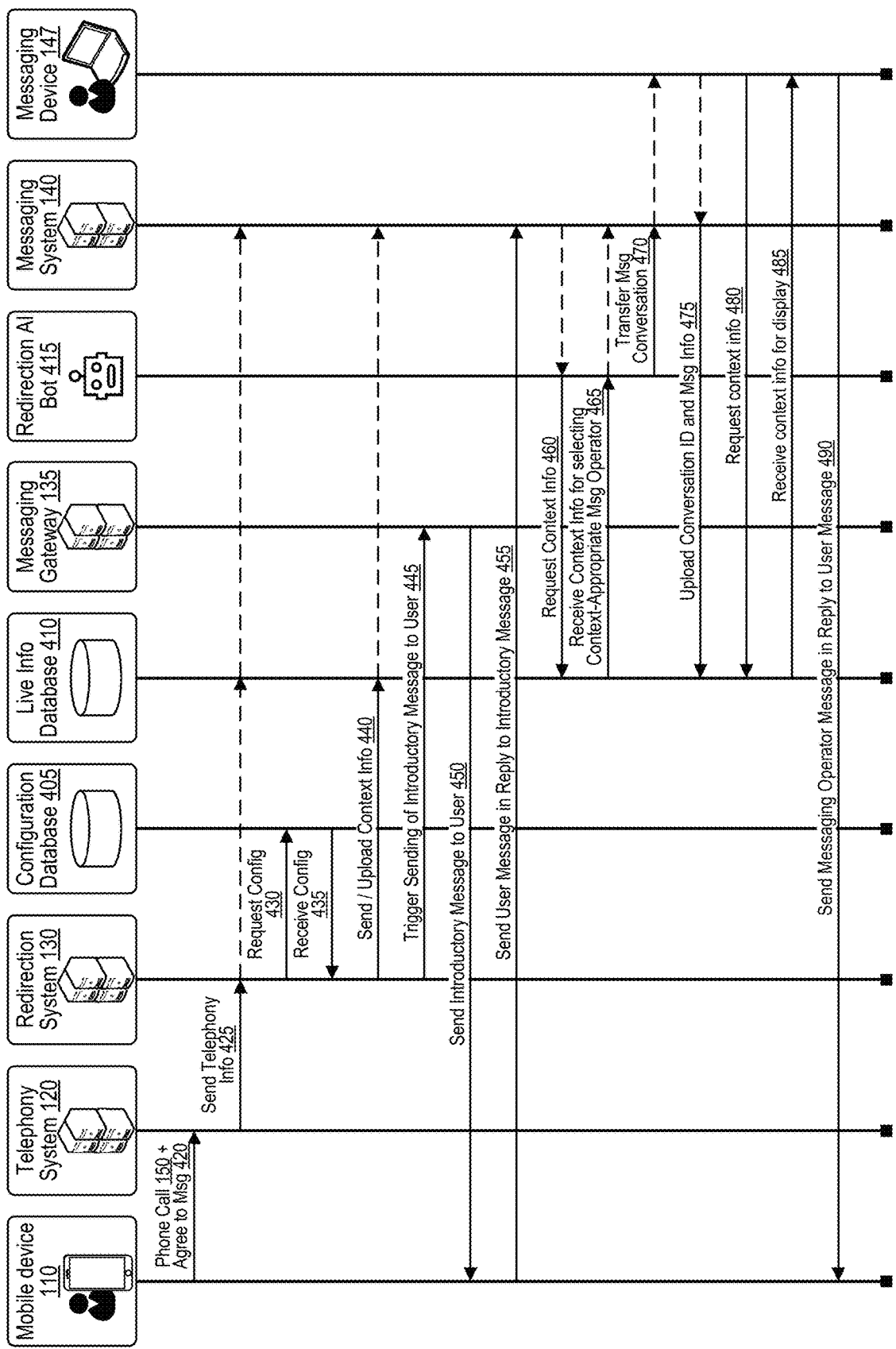
FIG. 4 is a swim lane flow diagram illustrating operations performed using a number of devices and systems involved in intelligent redirection of callers from the telephony environment to the messaging environment.

FIG. 4 is a swim lane flow diagram illustrating operations performed using a number of devices and systems involved in intelligent redirection of callers from the telephony environment to the messaging environment.

The devices identified in the columns of FIG. 4 are mostly shown in the architecture of FIG. 1 with a few exceptions. The configuration database 405 is a database that the redirection system 130 and messaging system 140 can use to identify configuration details such as which of a number of messaging services a particular company prefers to redirect its telephony system 120 to, optionally providing a preference ranking. The live info database 410 is used by the redirection system 130 and/or the messaging system 140 to store information such as telephony information and messages throughout the redirection process. The live info database 410 may, for example, be a specialized Live-Deflect® database. The redirection artificial intelligence (AI) bot 415 is a chatbot or virtual assistant that can help transfer the user 115 to an appropriate messaging operator 145 if the call context in the telephony information is not enough to do so.

At step 420, a phone call is initiated between the mobile device 110 and the telephony system 120 when the mobile device 110 calls the telephony system 120 (or receives a call from the telephony system 120). Still at step 420, the mobile device 110 optionally receives an option to switch from the telephony environment to the messaging environment (e.g., see dialogue 215 of FIG. 2), and the user 115 provides an input (e.g., a verbal or DTMF input) through the mobile device 110 indicating that the user agrees to transfer from the telephony environment to the messaging environment. In the example of dialogue 215 of FIG. 2, the telephony system 120 tells the mobile device 110 estimated wait time for a telephony operator 125 (43 minutes) and an estimated wait time for a messaging operator 145 (7 minutes). Such a discrepancy in wait times might provide the user 115 with additional incentive to switch from the telephony environment to the messaging environment. In some cases, the telephony system 120 will automatically switch the mobile device 110 from the telephony environment to the messaging environment without asking, for example if the estimated wait time for a telephony operator 125 exceeds the estimated wait time for a messaging operator 145 by at least a predetermined threshold duration of time, or if the redirection system is configured to redirect callers for a specific business function, or if the telephony system 120 is being phased out altogether in favor of the messaging system 140. If the estimated wait time for a messaging operator 145 exceeds the estimated wait time for a telephony operator 125 by at least a threshold duration of time, on the other hand, the user 115 might not be given the option to transfer the call to messaging at all. Absolute thresholds and relative thresholds alike can be used for either or both estimated wait times to determine whether one or both estimated wait times are sent from the redirection system 130 to the telephony system 120, whether one or both estimated wait times are presented to the user 115 by the telephony system 120, whether the user 115 is automatically routed to either staying on the line with the telephony system 120 or transferring to the messaging system 140, or a combination thereof.

At step 425, the telephony service sends the telephony information to the redirection system 130 and optionally to live info database and/or the messaging system 140. The telephony information may be sent by the telephony system 120 to the redirection system 130 by or as part of a representational state transfer (REST) application programming interface (API) call. At step 430, the redirection system 130 requests configuration information from the configuration database 405, and the redirection system 130 receives the configuration information from the configuration database 405 at step 435. The configuration information in the configuration database 405 identifies configuration details such as which of a number of messaging services a particular company prefers to redirect its telephony system 120 to, optionally providing a preference ranking.

At step 440, the redirection system 130 sends/uploads the call context information (and optionally other telephony information) to the live information database 410, and optionally to the messaging system 140. At step 445, the redirection system 130 triggers sending of an introductory message to the user by instructing the messaging gateway 135 to send the introductory message to the mobile device 110. At step 450, the messaging gateway 135 sends the introductory message to the mobile device 110.

At step 455, the mobile device 110 receives the introductory message sent in step 450 and sends a user message to the messaging system 140 in reply to the introductory message, the user message having been input by user 115 into the mobile device 110. In some cases, step 455 (or another user message step like 455) may occur after step 470 and/or step 480, in which case the user message may be sent onward by the messaging system 140 to the messaging device 147, or in some cases may be sent directly from the mobile device 110 to the messaging device 147, which may optionally report the message back to the messaging system 140.

At step 460, the messaging system 140 and/or the redirection AI bot 415 request context information from the live information database 410, which the live information database 410 provides back to the messaging system 140 and/or the redirection AI bot 415 at step 465. This context information may include the call context information and/or other telephony information, and may also include other context information illustrated in and discussed with respect to the context window 315 of FIG. 3, such as call history 365 or message history 390. The messaging system 140 and/or the redirection AI bot 415 use this context information to select a context-appropriate message operator 145 of a number of possible message operators, for example based on call skill/expertise 340, language spoken, availability, caller location 375, the configuration of steps 430/435, or a combination thereof. At step 470, the messaging system 140 and/or the redirection AI bot 415 transfers the conversation to the selected messaging operator 145, optionally generating at least part of the messaging operator interface 305 and sending this to the messaging device 147 of the selected messaging operator 145 at this step as well.

At step 475, which may occur before step 480 or after step 485 or even after step 490, the messaging system may upload a conversation identifier, such as a unique identification number or code corresponding to the conversation, to the live information database 410, along with message information of any messages already in the conversation, such as the introductory message of steps 450 and the user message of step 455. Context information can be requested by the messaging device 147 from the live information database 410 at step 480 and provided by the live information database 410 to the messaging device 147 at step 485. At step 490, the messaging device 147 sends the messaging operator 145's message in reply to the user message of step 455.

Any message sent by the redirection system 130, message system 145, message device 147, and/or message gateway 135 may be at least partially previously scripted. For instance, the introductory message sent in step 450, any messages (not shown in FIG. 4) sent from the redirection AI bot 415 to the mobile device 110, and/or the message sent by the messaging operator 145 in step 490 may be at least partially previously scripted, especially if the messaging operator 145 is a chatbot or virtual assistant. Any such message may alternately or additionally be at least partially generated based on call context or previous messages during the same conversation or a previous conversation so as to include information such as the user 115's name or other information identifying the user 115, or an account balance or other information associated with an object or service owned by the user 115 or otherwise associated with the user 115, or any context information identified in context window 315 of FIG. 3. Additionally, any message sent by the mobile device, redirection system 130, message system 145, and/or message device 147 may optionally be received by and conveyed along by the message gateway 135 along the way.

Figure 5:
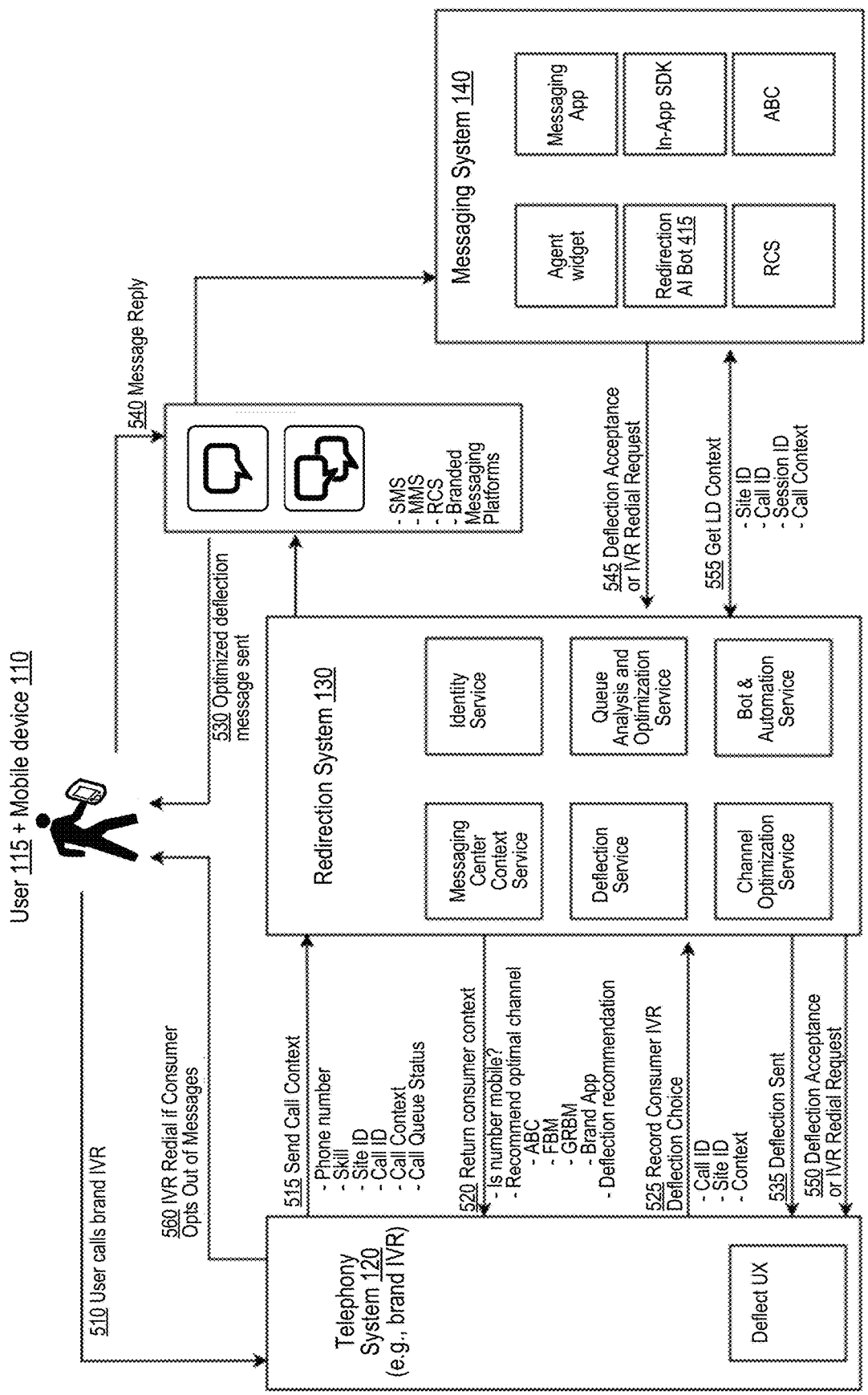
FIG. 5 is an architecture flow diagram illustrating further detail regarding the architecture of FIG. 1 and the processes of FIG. 4.

FIG. 5 is an architecture flow diagram illustrating further detail regarding the architecture of FIG. 1 and the processes of FIG. 4.

In particular, the architecture of FIG. 5 illustrates the user 115 and mobile device 110. The architecture of FIG. 5 illustrates the telephony system 120, such as a brand IVR (that is, an IVR associated with customer service for a brand or company), this time including a deflect UX software plugin that interacts with the telephony system 120 to send it the requested telephony information and to provide a back and forth, for instance to determine an optimal messaging service/channel based on information provided by the redirection system 130.

The architecture of FIG. 5 illustrates the redirection system 130, which includes a messaging center context service, an identity service, a deflection service, a queue analysis and optimization service, a channel optimization service, and a bot/automation service. Each of these may handle different aspects of the processes discussed below with respect to steps 515, 520, 525, 530, 535, 545, and 555.

The architecture of FIG. 5 illustrates the messaging system 140, which includes an agent widget that is used by the messaging device 147 of the messaging operator 145 (aka the messaging agent 145), a messaging app, the redirection AI bot 415, an in-app software development kit (SDK), Rich Communication Services (RCS), and Apple Business Chat® interface. Each of these may handle different aspects of the processes discussed below with respect to steps 540, 545, and 555.

At step 510, the user 115 (who may in some cases be referred to as the caller or the consumer) calls the telephony system 120 from the mobile device 110. At step 515, the telephony system 120 sends certain the telephony information (including call context such as phone number, skill site ID, call ID, call context, call queue status) to the redirection system 130. At step 520, the redirection system 130 returns user context (AKA consumer context) to the telephony system 120, for example identifying if the number is a mobile number and recommending an optimal message service or channel (e.g., message service that the user 115 is most likely to use/see/read). At step 525, the telephony service 120 records and conveys the user 115's IVR redirection/deflection choice to the redirection system 130, again possibly providing additional telephony info such as call ID, site ID, and call context.

At step 530, an introductory message is sent via the recommended optimal message service or channel. The optimal message service or channel may be any previously discussed channel, such as SMS, MIMS, RCS, or a branded messaging system such as Apple® iMessage®, Apple® Business Chat® (ABC), Google® Rich Communication Services (RCS) for Business Messaging® (GRBM), Google® Jibe®, Google® Hangouts®, Google® Allo®, Google® Duo®, Facebook® Messenger® (FBM), WhatsApp®, Slack® Channels®, Skype® Instant Messenger®, Blackberry® Messenger®, Line®, Viber®, Rich Communication Services (RCS) provided by telecommunications provider(s), or similar services.

At step 535, the redirection system 130 sends the telephony system 120 confirmation that redirection/deflection has occurred. At step 540, the user 115 replies to the message of step 530 via the mobile device 110. Both messages are conveyed to the messaging system 140. At step 545, the receipt of the user message in step 540 is treated as the user accepting the redirection/deflection, and this is conveyed from the messaging system 140 to the redirection system 130, and then at step 550 from the redirection system to the telephony system, 120. At step 555, the messaging system 140 receives call context from the redirection system 130, and conveys message context to the redirection system 130.

Step 560 occurs if steps 540-555 never occurred—in which case the redirection/deflection to messaging is never accepted by the user, or the user expressly opts out of the redirection/deflection to messaging either during the phone call or via the user 115's response message of step 540, and the telephony system 120 redials the customer to connect via phone call once again if needed.

Figure 6:
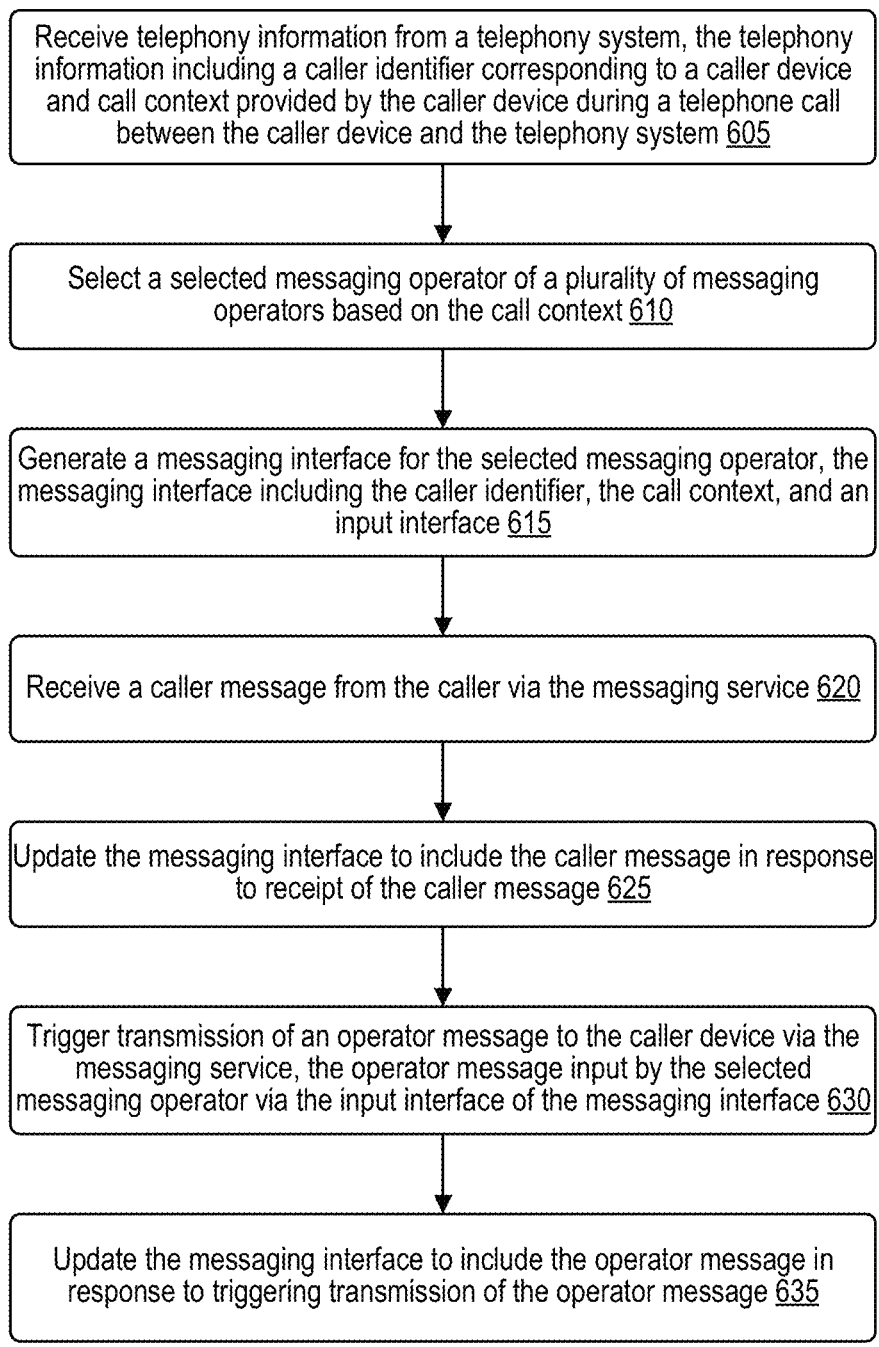
FIG. 6 is a flow diagram illustrating operations for context-aware caller redirection from a telephony environment to a messaging environment.

FIG. 6 is a flow diagram illustrating operations for context-aware caller redirection from a telephony environment to a messaging environment.

The flow diagram of FIG. 6 may be performed by the redirection system 130, the messaging gateway 135, the messaging system 140, or some combination thereof. With respect to the flow diagram of FIG. 6, any combination of one or more of these system is referred to as the one or more system(s).

At step 605, the one or more system(s) receive telephony information from a telephony system. The telephony information includes a caller identifier corresponding to a caller device and call context provided by the caller device during a telephone call between the caller device and the telephony system.

At step 610, the one or more system(s) select a selected messaging operator of a plurality of messaging operators based on the call context.

At step 615, the one or more system(s) generate a messaging interface for the selected messaging operator, the messaging interface including the caller identifier, the call context, and an input interface.

At step 620, the one or more system(s) receive a caller message from the caller via the messaging service. At step 625, the one or more system(s) update the messaging interface to include the caller message in response to receipt of the caller message.

At step 630, the one or more system(s) trigger transmission of an operator message to the caller device via the messaging service, the operator message having been input by the selected messaging operator via the input interface of the messaging interface. At step 635, the one or more system(s) update the messaging interface to include the operator message in response to triggering transmission of the operator message.

FIG. 7 illustrates an exemplary computing system 700 that may be used to implement some aspects of the subject technology. For example, any of the computing devices, computing systems, network devices, network systems, servers, and/or arrangements of circuitry described herein may include at least one computing system 700, or may include at least one component of the computer system 700 identified in FIG. 7. The computing system 700 of FIG. 7 includes one or more processors 710 and memory 720. Each of the processor(s) 710 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 710 may include one or more cores, either integrated onto a single chip or spread across multiple chips connected or coupled together. Memory 720 stores, in part, instructions and data for execution by processor 710. Memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing some aspects of the subject technology for purposes of loading that software into memory 720.

Portable storage device 740 operates in conjunction with a portable non-volatile storage medium, such as a floppy disk, compact disk or Digital video disc, to input and output data and code to and from the computer system 700 of FIG. 7. The system software for implementing aspects of the subject technology may be stored on such a portable medium and input to the computer system 700 via the portable storage device 740.

The memory 720, mass storage device 730, or portable storage 740 may in some cases store sensitive information, such as transaction information, health information, or cryptographic keys, and may in some cases encrypt or decrypt such information with the aid of the processor 710. The memory 720, mass storage device 730, or portable storage 740 may in some cases store, at least in part, instructions, executable code, or other data for execution or processing by the processor 710.

Output devices 750 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 770. The printer may be inkjet, laserjet, thermal, or some combination thereof. In some cases, the output device circuitry 750 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 750 may include any ports, plugs, antennae, wired or wireless transmitters, wired or wireless transceivers, or any other components necessary for or usable to implement the communication types listed above, such as cellular Subscriber Identity Module (SIM) cards.

Input devices 760 may include circuitry providing a portion of a user interface. Input devices 760 may include an alpha-numeric keypad, such as a keyboard, for inputting alpha-numeric and other information, or a pointing device, such as a mouse, a trackball, stylus, or cursor direction keys. Input devices 760 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 760 may include any ports, plugs, antennae, wired or wireless receivers, wired or wireless transceivers, or any other components necessary for or usable to implement the communication types listed above, such as cellular SIM cards.

Input devices 760 may include receivers or transceivers used for positioning of the computing system 700 as well. These may include any of the wired or wireless signal receivers or transceivers. For example, a location of the computing system 700 can be determined based on signal strength of signals as received at the computing system 700 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 700 such as a router, modem, switch, hub, bridge, gateway, or repeater. These may also include Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 760 may include receivers or transceivers corresponding to one or more of these GNSS systems.

Display system 770 may include a liquid crystal display (LCD), a plasma display, an organic light-emitting diode (OLED) display, an electronic ink or "e-paper" display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include one or more additional output devices of any of the types discussed with respect to output device 750, one or more additional input devices of any of the types discussed with respect to input device 760, one or more additional display systems of any of the types discussed with respect to display system 770, one or more memories or mass storage devices or portable storage devices of any of the types discussed with respect to memory 720 or mass storage 730 or portable storage 740, a modem, a router, an antenna, a wired or wireless transceiver, a printer, a bar code scanner, a quick-response ("QR") code scanner, a magnetic stripe card reader, a integrated circuit chip (ICC) card reader such as a smart-card reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 700 of FIG. 7 can include those typically found in computer systems that may be suitable for use with some aspects of the subject technology and represent a broad category of such computer components that are well known in the art. That said, the computer system 700 of FIG. 7 can be customized and specialized for the purposes discussed herein and to carry out the various operations discussed herein, with specialized hardware components, specialized arrangements of hardware components, and/or specialized software. Thus, the computer system 700 of FIG. 7 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 700 may in some cases be a virtual computer system executed by another computer system. The computer can also include different bus configurations, networked platforms, multi-processor platforms, etc. Various operating systems can be used including Unix®, Linux®, FreeB SD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 700 may also use a Basic Input/Output System (BIOS) or Unified Extensible Firmware Interface (UEFI) as a layer upon which the operating system(s) are run.

In some cases, the computer system 700 may be part of a multi-computer system that uses multiple computer systems 700, each for one or more specific tasks or purposes. For example, the multi-computer system may include multiple computer systems 700 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 700 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 720, the mass storage 730, the portable storage 740, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L6), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 710 for execution. A bus 790 carries the data to system RAM or another memory 720, from which a processor 710 retrieves and executes the instructions. The instructions received by system RAM or another memory 720 can optionally be stored on a fixed disk (mass storage device 730/portable storage 740) either before or after execution by processor 710. Various forms of storage may likewise be implemented as well as the necessary network interfaces and network topologies to implement the same.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 700 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of context-aware interfacing, the method comprising:
receiving a recording of a voice of a caller from a telephone call;
interpreting the recording of the voice of the caller using a voice recognition algorithm to generate an interpreted message;
automatically generating a response that is responsive to the interpreted message and customized to the caller; and
outputting the response during the telephone call using a text-to-speech algorithm.

2. The method of claim 1, wherein the response is automatically generated using an artificially intelligent chatbot based on the interpreted message.

3. The method of claim 1, further comprising:
identifying a topic based on the interpreted message; and
selecting an artificially intelligent chatbot based on the topic, wherein the response is automatically generated using the selected artificially intelligent chatbot.

4. The method of claim 1, wherein the response includes a name of the caller.

5. The method of claim 1, wherein the response identifies an account balance of the caller.

6. The method of claim 1, wherein the response includes information associated with an object owned by the caller.

7. The method of claim 1, further comprising:
retrieving information from a database based on the interpreted message, wherein the response is generated to include the information from the database.

8. The method of claim 1, further comprising:
modifying information in a database based on the interpreted message, wherein the response is generated to include an indication that the information in the database is modified.

9. The method of claim 1, further comprising:
modifying user profile information associated with the caller based on the interpreted message, wherein the response is generated to include an indication that the user profile information is modified.

10. The method of claim 1, further comprising:
receiving a second recording of the voice of the caller from the telephone call after the response is output; and
interpreting the second recording of the voice of the caller using the voice recognition algorithm to generate a second interpreted message.

11. The method of claim 1, further comprising:
automatically generating a second response that is responsive to a second interpreted message and customized to the caller, the second interpreted message corresponding to a second recording of the voice of the caller; and
outputting the second response during the telephone call using the text-to-speech algorithm.

12. The method of claim 1, wherein a portion of the response includes pre-recorded audio.

13. The method of claim 1, wherein the response is configured to redirect the caller from the telephone call to a messaging conversational interface using a messaging platform.

14. The method of claim 1, further comprising:
outputting the response through a messaging conversational interface using a messaging platform.

15. The method of claim 1, further comprising:
automatically generating a second response; and
outputting the second response through a messaging conversational interface using a messaging platform.

16. The method of claim 1, further comprising:
determining a wait time associated with the telephone call; and
determining a wait time associated with a messaging platform, wherein the response is based on a comparison between the wait time associated with the telephone call and the wait time associated with the messaging platform.

17. The method of claim 1, further comprising:
determining a wait time, wherein the response is generated to identify the wait time, wherein the wait time is associated with at least one of the telephone call or a messaging platform.

18. The method of claim 1, further comprising:
identifying a messaging operator to connect the caller to through a messaging platform; and
connecting the caller to the messaging operator through a messaging conversational interface.

19. The method of claim 1, further comprising:
identifying a telephone operator to connect the caller to.

20. The method of claim 1, further comprising:
receiving call context information about the telephone call, wherein the response is generated also based on the call context information.

21. A apparatus of context-aware interfacing, the apparatus comprising:
at least one memory; and
at least one processor that executes instructions stored in the at least one memory to:
receive a recording of a voice of a caller from a telephone call;
interpret the recording of the voice of the caller using a voice recognition algorithm to generate an interpreted message;
automatically generate a response that is responsive to the interpreted message and customized to the caller; and
output the response during the telephone call using a text-to-speech algorithm.

22. The apparatus of claim 21, wherein the response is automatically generated using an artificially intelligent chatbot based on the interpreted message.

23. The apparatus of claim 21, the at least one processor to:
identify a topic based on the interpreted message; and
select an artificially intelligent chatbot based on the topic, wherein the response is automatically generated using the selected artificially intelligent chatbot.

24. The apparatus of claim 21, wherein the response includes a name of the caller.

25. The apparatus of claim 21, wherein the response identifies an account balance of the caller.

26. The apparatus of claim 21, wherein the response includes information associated with an object owned by the caller.

27. The apparatus of claim 21, the at least one processor to:
retrieve information from a database based on the interpreted message, wherein the response is generated to include the information from the database.

28. The apparatus of claim 21, the at least one processor to:
modify information in a database based on the interpreted message, wherein the response is generated to include an indication that the information in the database is modified.

29. The apparatus of claim 21, the at least one processor to:
modify user profile information associated with the caller based on the interpreted message, wherein the response is generated to include an indication that the user profile information is modified.

30. The apparatus of claim 21, the at least one processor to:
receive a second recording of the voice of the caller from the telephone call; and
interpret the second recording of the voice of the caller using the voice recognition algorithm to generate a second interpreted message.

31. The apparatus of claim 21, the at least one processor to:
automatically generate a second response that is responsive to a second interpreted message and customized to the caller, the second interpreted message corresponding to a second recording of the voice of the caller; and
output the second response during the telephone call using the text-to-speech algorithm.

32. The apparatus of claim 21, wherein a portion of the response includes pre-recorded audio.

33. The apparatus of claim 21, wherein the response is configured to redirect the caller from the telephone call to a messaging conversational interface using a messaging platform.

34. The apparatus of claim 21, the at least one processor to:
output the response through a messaging conversational interface using a messaging platform.

35. The apparatus of claim 21, the at least one processor to:
automatically generate a second response; and
output the second response through a messaging conversational interface using a messaging platform.

36. The apparatus of claim 21, the at least one processor to:
determine a wait time associated with the telephone call; and
determine a wait time associated with a messaging platform, wherein the response is based on a comparison between the wait time associated with the telephone call and the wait time associated with the messaging platform.

37. The apparatus of claim 21, the at least one processor to:
determine a wait time, wherein the response is generated to identify the wait time, wherein the wait time is associated with at least one of the telephone call or a messaging platform.

38. The apparatus of claim 21, the at least one processor to:
identify a messaging operator to connect the caller to through a messaging platform; and
connect the caller to the messaging operator through a messaging conversational interface.

39. The apparatus of claim 21, the at least one processor to:
identify a telephone operator to connect the caller to.

40. The apparatus of claim 21, the at least one processor to:
receive call context information about the telephone call, wherein the response is generated also based on the call context information.

41. A non-transitory computer readable storage medium having embodied thereon a program, wherein the program is executable by a processor to perform a method of context-aware interfacing, the method comprising:
receiving a recording of a voice of a caller from a telephone call;

interpreting the recording of the voice of the caller using a voice recognition algorithm to generate an interpreted message;

automatically generating a response that is responsive to the interpreted message and customized to the caller; and outputting the response during the telephone call using a text-to-speech algorithm.

42. The non-transitory computer readable storage medium of claim 41, wherein the response is automatically generated using an artificially intelligent chatbot based on the interpreted message.

43. The non-transitory computer readable storage medium of claim 41, the method further comprising:

identifying a topic based on the interpreted message; and selecting an artificially intelligent chatbot based on the topic, wherein the response is automatically generated using the selected artificially intelligent chatbot.

44. The non-transitory computer readable storage medium of claim 41, wherein the response includes a name of the caller.

45. The non-transitory computer readable storage medium of claim 41, wherein the response identifies an account balance of the caller.

46. The non-transitory computer readable storage medium of claim 41, wherein the response includes information associated with an object owned by the caller.

47. The non-transitory computer readable storage medium of claim 41, the method further comprising:

retrieving information from a database based on the interpreted message, wherein the response is generated to include the information from the database.

48. The non-transitory computer readable storage medium of claim 41, the method further comprising:

modifying information in a database based on the interpreted message, wherein the response is generated to include an indication that the information in the database is modified.

49. The non-transitory computer readable storage medium of claim 41, the method further comprising:

modifying user profile information associated with the caller based on the interpreted message, wherein the response is generated to include an indication that the user profile information is modified.

50. The non-transitory computer readable storage medium of claim 41, the method further comprising:

receiving a second recording of the voice of the caller from the telephone call; and interpreting the second recording of the voice of the caller using the voice recognition algorithm to generate a second interpreted message.

51. The non-transitory computer readable storage medium of claim 41, the method further comprising:

automatically generating a second response that is responsive to a second interpreted message and customized to the caller, the second interpreted message corresponding to a second recording of the voice of the caller; and outputting the second response during the telephone call using the text-to-speech algorithm.

52. The non-transitory computer readable storage medium of claim 41, wherein a portion of the response includes pre-recorded audio.

53. The non-transitory computer readable storage medium of claim 41, wherein the response is configured to redirect the caller from the telephone call to a messaging conversational interface using a messaging platform.

54. The non-transitory computer readable storage medium of claim 41, the method further comprising:

outputting the response through a messaging conversational interface using a messaging platform.

55. The non-transitory computer readable storage medium of claim 41, the method further comprising:

automatically generating a second response; and outputting the second response through a messaging conversational interface using a messaging platform.

56. The non-transitory computer readable storage medium of claim 41, the method further comprising:

determining a wait time associated with the telephone call; and determining a wait time associated with a messaging platform, wherein the response is based on a comparison between the wait time associated with the telephone call and the wait time associated with the messaging platform.

57. The non-transitory computer readable storage medium of claim 41, the method further comprising:

determining a wait time, wherein the response is generated to identify the wait time, wherein the wait time is associated with at least one of the telephone call or a messaging platform.

58. The non-transitory computer readable storage medium of claim 41, the method further comprising:

identifying a messaging operator to connect the caller to through a messaging platform; and connecting the caller to the messaging operator through a messaging conversational interface.

59. The non-transitory computer readable storage medium of claim 41, the method further comprising:

identifying a telephone operator to connect the caller to.

60. The non-transitory computer readable storage medium of claim 41, the method further comprising:

receiving call context information about the telephone call, wherein the response is generated also based on the call context information.

* * * * *